US008508955B2

(12) United States Patent
Yokote

(10) Patent No.: US 8,508,955 B2
(45) Date of Patent: Aug. 13, 2013

(54) ELECTRONIC APPARATUS

(75) Inventor: Satoshi Yokote, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/150,951

(22) Filed: Jun. 1, 2011

(65) Prior Publication Data

US 2011/0310581 A1 Dec. 22, 2011

(30) Foreign Application Priority Data

Jun. 18, 2010 (JP) ................................. 2010-139793

(51) Int. Cl.
*H05K 7/02* (2006.01)

(52) U.S. Cl.
USPC ................. 361/807; 361/679.01; 361/679.02; 361/728; 340/7.6; 340/407.1; 310/81

(58) Field of Classification Search
USPC ....... 361/679.01–679.02, 728–730, 807–810, 361/825, 829
See application file for complete search history.

(56) References Cited

U.S. PATENT DOCUMENTS

| | | | | |
|---|---|---|---|---|
| 5,801,466 | A * | 9/1998 | Odagiri et al. | 310/81 |
| 5,943,214 | A * | 8/1999 | Sato et al. | 361/752 |
| 6,317,032 | B1 * | 11/2001 | Oishi | 340/407.1 |
| 6,424,064 | B2 * | 7/2002 | Ibata et al. | 310/81 |
| 6,542,381 | B1 * | 4/2003 | Sei et al. | 361/801 |
| 6,714,123 | B1 * | 3/2004 | Miyake et al. | 340/407.1 |
| 6,875,028 | B2 | 4/2005 | Kita et al. | |
| 7,023,114 | B2 * | 4/2006 | Takagi et al. | 310/81 |
| 7,268,673 | B2 * | 9/2007 | Wolff | 340/407.1 |
| 7,619,335 | B2 * | 11/2009 | Suzuki et al. | 310/81 |
| 7,646,122 | B2 * | 1/2010 | Uchiumi et al. | 310/81 |
| 8,013,486 | B2 * | 9/2011 | Umehara et al. | 310/81 |
| 2003/0236008 | A1 | 12/2003 | Kita et al. | |
| 2005/0023427 | A1 * | 2/2005 | Chen et al. | 248/346.03 |

FOREIGN PATENT DOCUMENTS

| | | |
|---|---|---|
| JP | 52-043050 U | 3/1977 |
| JP | 57-184299 A | 11/1982 |
| JP | 63-145381 U | 9/1988 |
| JP | 1-143183 | 10/1989 |
| JP | 09-090164 A | 4/1997 |
| JP | 10-136608 | 5/1998 |
| JP | 2001-127856 | 5/2001 |
| JP | 2003-143798 | 5/2003 |
| JP | 2004-032839 | 1/2004 |
| JP | 2009-011113 | 1/2009 |

OTHER PUBLICATIONS

Notice of Reasons for Rejection mailed by the Japan Patent Office on Sep. 27, 2011 in corresponding Japanese Patent Application No. 2010-139793 in 4 pages.

* cited by examiner

*Primary Examiner* — Courtney Smith
(74) *Attorney, Agent, or Firm* — Knobbe, Martens, Olson & Bear LLP

(57) ABSTRACT

According to one embodiment, an electronic apparatus includes a casing, a module unit, an installation portion, and a holding portion. The module unit includes an elastic cover member including a projection, and a module fitted in the cover member. The installation portion is provided inside the casing and configured to receive the module unit. The holding portion is projected from the installation portion and configured to surround and hold the module unit. The holding portion includes a fitting portion which is located at a peripheral region thereof and in which the projection is fitted, and a pair of edge portions configured to define the fitting portion and being more away from each other at positions closer to a peripheral region of the holding portion. The projection is in contact with the edge portions and is exposed in the fitting portion to an outside region of the holding portion.

16 Claims, 9 Drawing Sheets

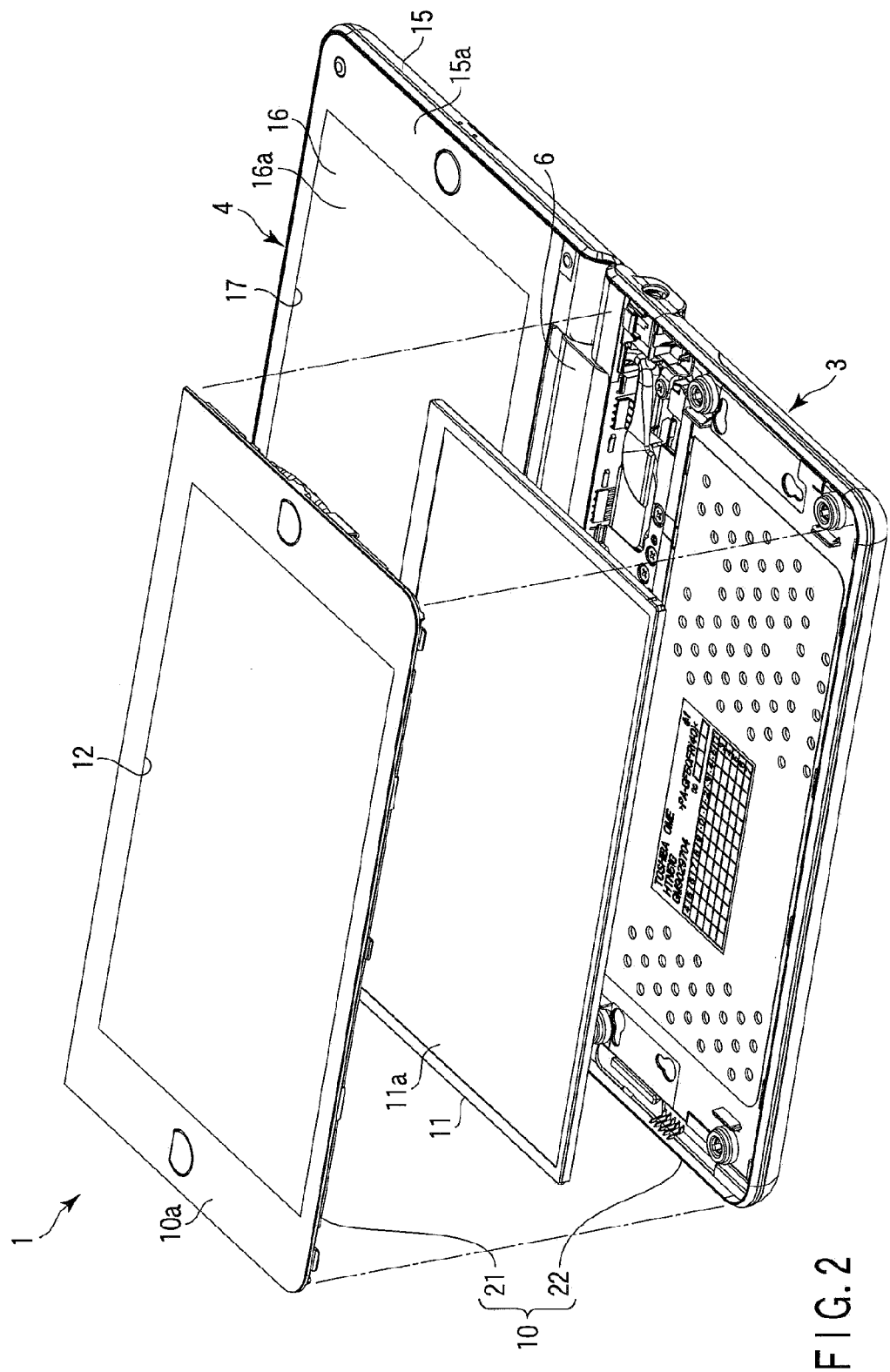
F I G. 2

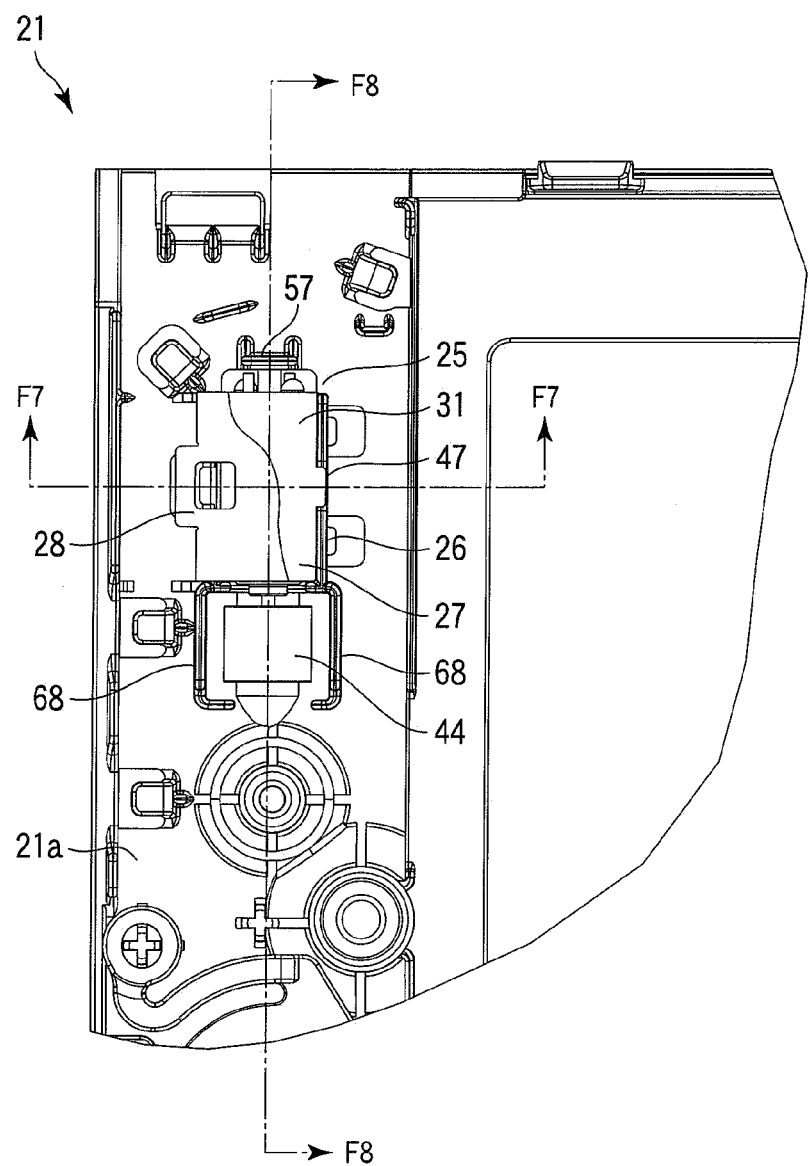
F I G. 4

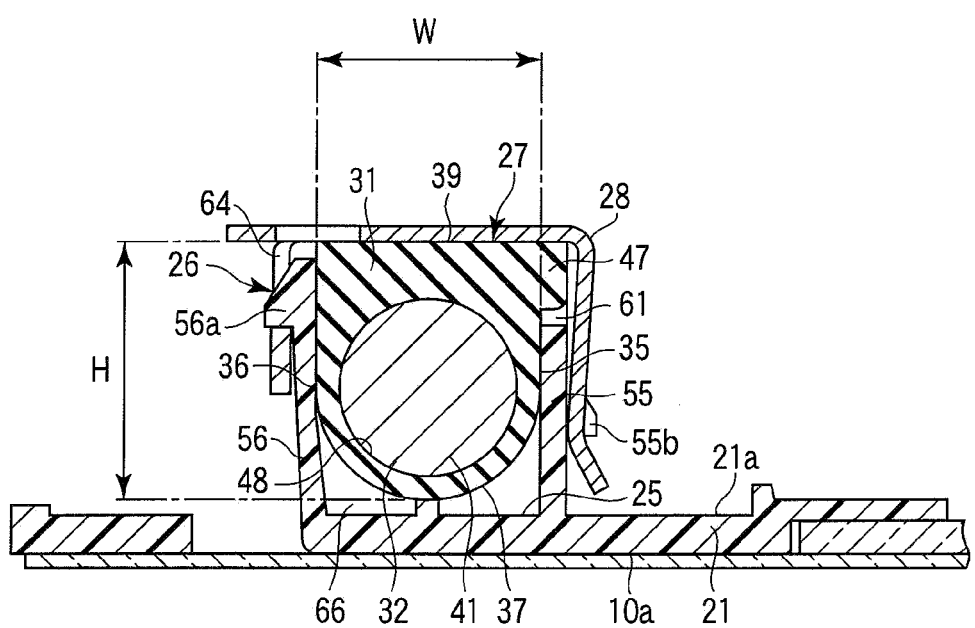
F I G. 7

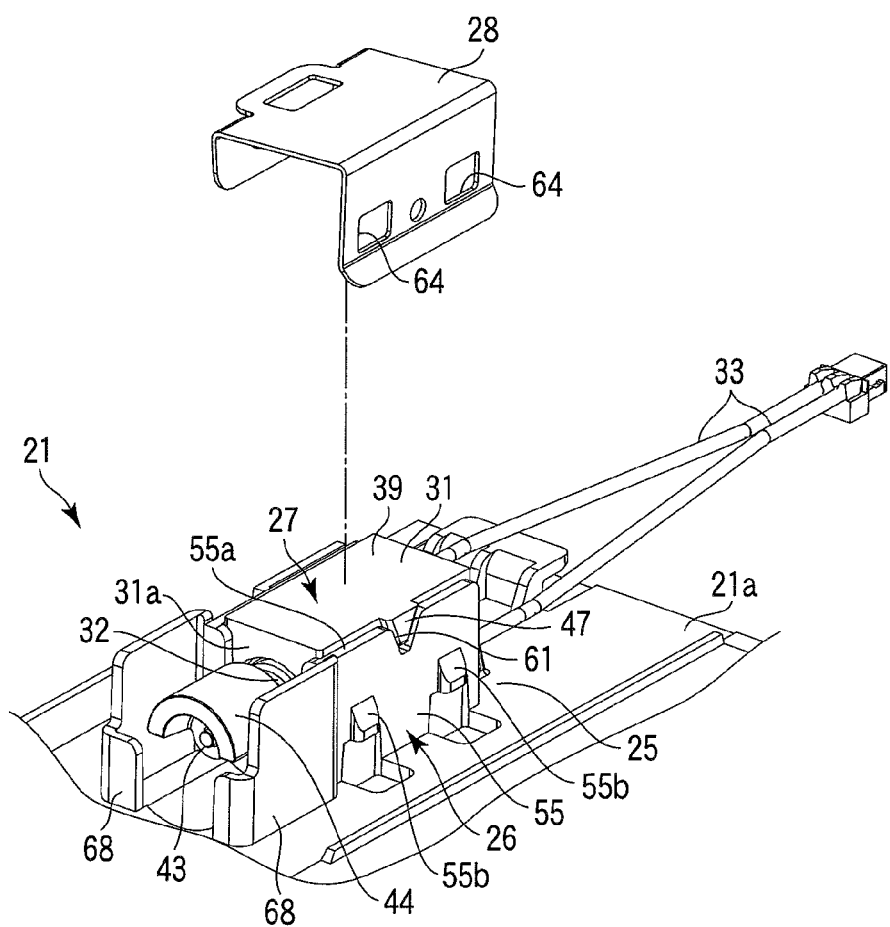
F I G. 10

ELECTRONIC APPARATUS

CROSS-REFERENCE TO RELATED APPLICATIONS

This application is based upon and claims the benefit of priority from Japanese Patent Application No. 2010-139793, filed Jun. 18, 2010; the entire contents of which are incorporated herein by reference.

FIELD

Embodiments described herein relate generally to an electronic apparatus.

BACKGROUND

An electronic apparatus, such as a portable telephone or a portable game machine, comprises a module contained inside a casing and configured to vibrate the electronic apparatus. The module is, for example, a motor comprising a rotating shaft and an eccentric weight attached to the rotating shaft.

A module provided for this type of electronic apparatus is very small. Such a small module is hard to attach accurately to an intended position inside the casing. For example, the module may be attached and directed in a different direction from the intended direction.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exploded perspective view of the portable computer according to the embodiment;

FIG. 4 is a plan view showing part of the mask member of the embodiment in an enlarged scale;

FIG. 7 is a sectional view taken along line F7-F7 in FIG. 4;

FIG. 10 is a perspective view showing a state where the fixing member is separated from the mask member of the embodiment.

DETAILED DESCRIPTION

Various embodiments will be described hereinafter with reference to the accompanying drawings.

In general, according to one embodiment, an electronic apparatus includes a casing, a module unit, an installation portion, and a holding portion. The module unit includes an elastic cover member including a projection; and a module fitted in the cover member. The installation portion is provided inside the casing and configured to receive the module unit. The holding portion is projected from the installation portion and configured to surround and hold the module unit. The holding portion includes: a fitting portion which is located at a peripheral region thereof and in which the projection is fitted; and a pair of edge portions configured to define the fitting portion and being more away from each other at positions closer to a peripheral region of the holding portion. The projection is in contact with the edge portions and is exposed in the fitting portion to an outside region of the holding portion.

An embodiment will now be described below with reference to FIGS. 1 through 10. In this specification, the side nearest the user is defined as the front; that furthest from the user, the rear; that to the left of the user, the left; that to the right of the user, the right; that facing upward relative to the user, up; and that facing downward relative to the user, down.

Figure 1:
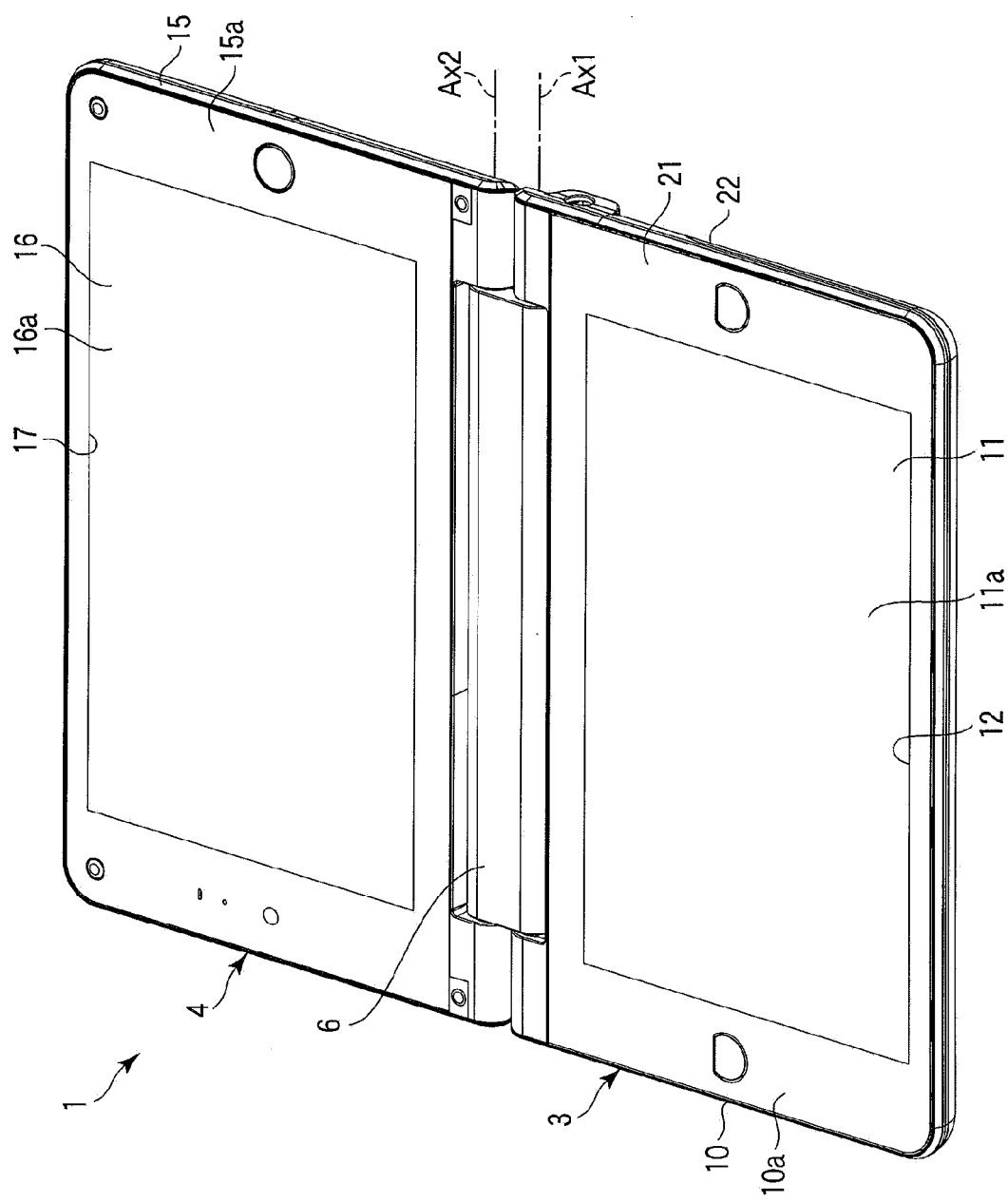
FIG. 1 is a perspective view of a portable computer according to one embodiment.

FIG. 1 is a perspective view of a portable computer 1. The personal computer 1 is an example of an electronic apparatus. As shown in FIG. 1, the personal computer 1 comprises a first unit 3 and a second unit 4.

The first unit 3 and the second unit 4 are coupled together by means of a hinge mechanism 6. The hinge mechanism 6 is coupled to an end portion of the first unit 3 in such a manner as to enable rotation around a first axis Ax1. The hinge mechanism 6 is coupled to an end portion of the second unit 4 in such a manner as to enable rotation around a second axis Ax2. The first axis Ax1 and the second axis Ax2 extend in parallel to each other.

The first unit 3 and the second unit 4 are rotatable relative to each other, between an expanded state (shown in FIG. 1) and a folded state (not shown). In the expanded state, the second unit 4 is adjacent to the first unit 3. In the folded state, the second unit 4 is laid on the first unit 3.

The first unit 3 comprises a flat box-like first casing 10 and a touch screen module 11. The first casing 10 is an example of a casing. The touch screen module 11 is formed, for example, by laying a transparent touchpanel 11a on the display section of a liquid display. The touch screen module 11 is contained in the first casing 10.

A first opening section 12 is provided on the inner surface 10a of the first casing 10. In the folded state, the inner surface 10a is opposed to the second unit 4. The first opening section 12 permits the touchpanel 11a to be exposed to the outside of the first unit 3.

The second unit 4 comprises a flat box-like second casing 15 and a display module 16. The display module 16 is a liquid crystal display, for example. The display module 16 is contained in the second casing 15.

A second opening section 17 is formed in the inner surface 15a of the second casing 15. In the folded state, the inner surface 15a is opposed to the first unit 3. The second opening section 17 permits the screen 16a of the display module 16 to be exposed to the outside of the second unit 4.

FIG. 2 is an exploded perspective view of the portable computer 1. As shown in FIG. 2, the first casing 10 comprises a mask member 21 and a base member 22. The mask member 21 is attached to the base member 22. The touch screen module 11 is located between the mask member 21 and the base member 22.

Figure 3:
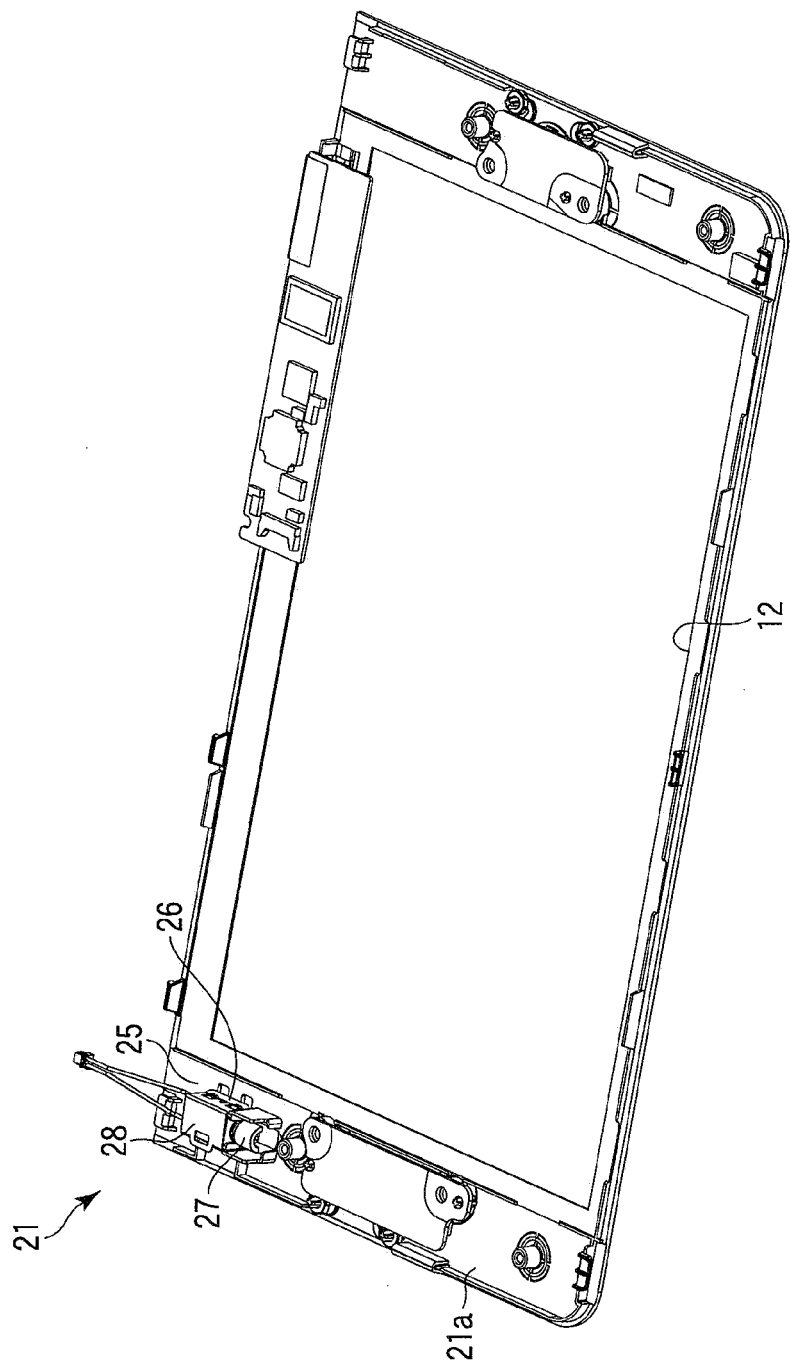
FIG. 3 is a perspective view of a mask member employed in the embodiment.

FIG. 3 is a perspective view of the mask member 21 employed in the embodiment. The mask member 21 forms the inner surface 10a of the first casing 10, as shown in FIG. 2. As shown in FIG. 3, the mask member 21 comprises an inner face 21a located opposite the inner surface 10a.

FIG. 4 is a plan view showing part of the mask member 21 in an enlarged scale. The mask member 21 is provided with an installation portion 25 on the inner face 21a. The installation portion 25 is part of the inner face 21a provided inside the first casing 10. The installation portion 25 may be provided independently of the mask member 21.

The installation portion 25 is provided with a holding portion 26. A module unit 27 is arranged on the installation portion 25 in the state where it is surrounded by the holding portion 26. A fixing member fixing member 28 is attached to the holding portion 26 in such a manner that it covers the module unit 27. The holding portion 26, the module unit 27 and fixing member 28 will be described in detail.

The module unit 27 is contained inside the first casing 10. The module unit 27 is very small in comparison with the personal computer 1. The size of the module unit 27 is determined in accordance with the size and the manner of application of the personal computer 1.

Figure 5:
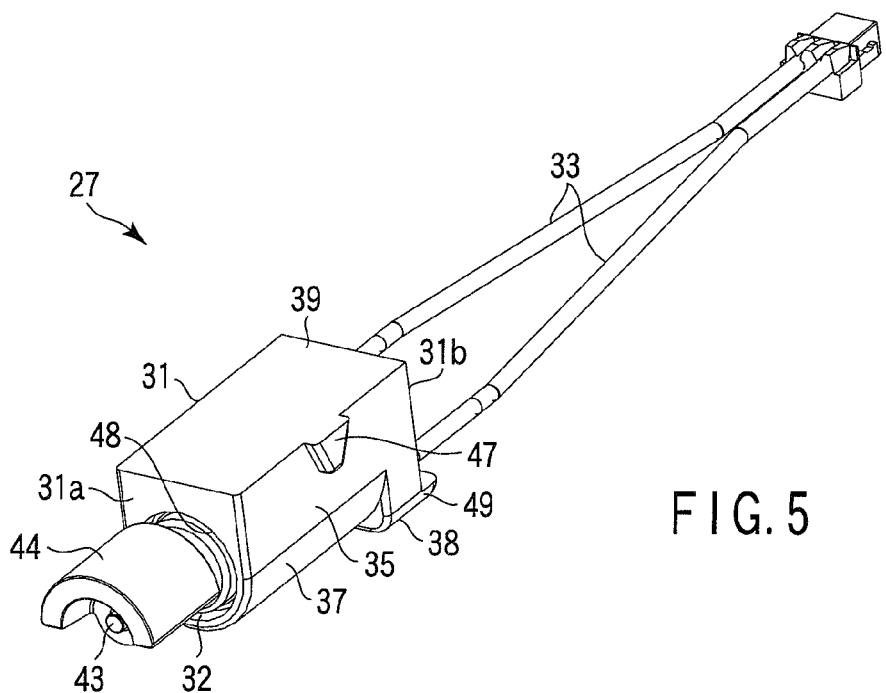
FIG. 5 is a perspective view of a module unit employed in the embodiment.
Figure 6:
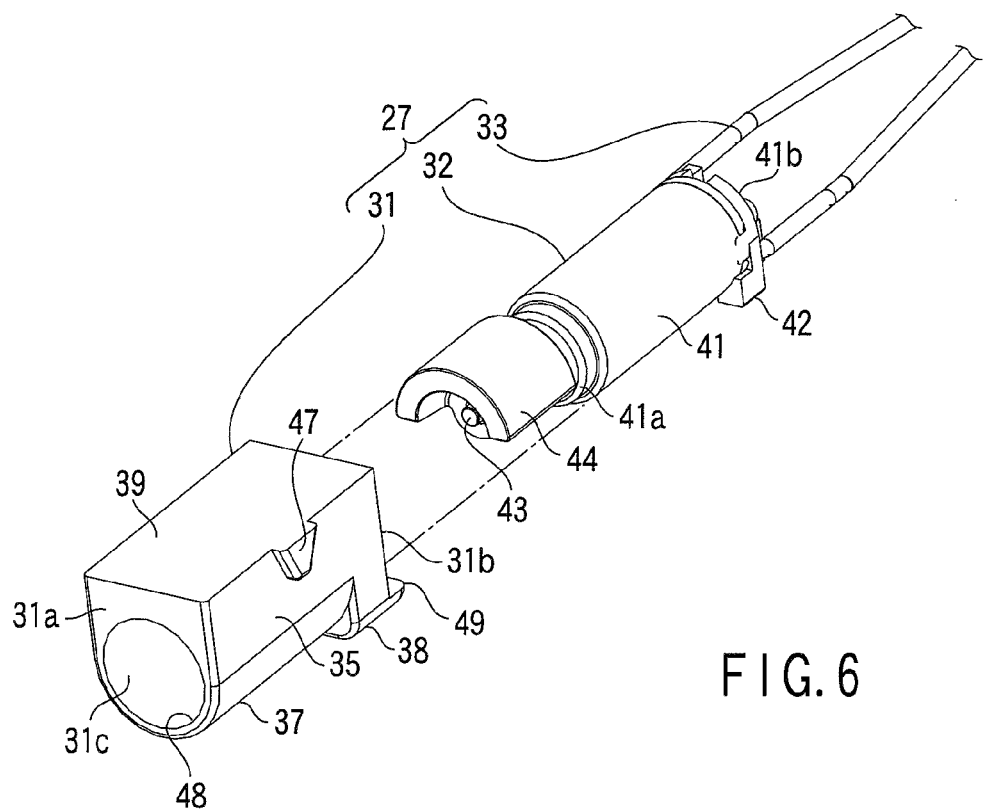
FIG. 6 is an exploded perspective view of the module unit of the embodiment.

FIG. 5 is a perspective view of the module unit 27. FIG. 6 is an exploded perspective view of the module unit 27. The module unit 27 comprises a cover member 31, a module 32 and cables 33. The module 32 is fitted into the cover member 31.

The module unit 27 comprises a first side face 35, a second side face 36 (shown in FIG. 7), a first bottom face 37, a second bottom face 38 and a top face 39. The first bottom face 37 and the second bottom face 38 are examples of a bottom face of a module unit.

The second side face 36 is opposite the first side face 35. The first bottom face 37 is curved. The second bottom face 38 is flat and is projected from the first bottom face 37.

The first bottom face 37 and the second bottom face 38 are opposed to the installation portion 25. The first bottom face 37 is located in a side of one end 31a of the cover member 31. The second bottom face 38 is located in a side of the other end 31b of the cover member 31. The top face 39 is located opposite the first bottom face 37 and second bottom face 38.

The module 32 is a so-called vibrating motor. As shown in FIG. 6, the module 32 comprises a trunk portion 41, an overhang portion 42, a rotating shaft 43 and an eccentric weight 44. The trunk portion 41 is cylindrical. The trunk portion 41 need not be cylindrical but may have another elongated shape such as a square pillar.

The rotating shaft 43 extends from one end 41a of the trunk portion 41 and coaxial with the trunk portion 41. The eccentric weight 44 is attached to the rotating shaft 43. The overhang portion 42 is provided at the other end 41b of the trunk portion 41. The overhang portion 42 is projected outward from the outer circumference of the trunk portion 41.

The cables 33 extend from the other end 41b of the trunk portion 41. As shown in FIG. 5, a connector is provided at ends of the cables 33. The cables 33 are installed inside the first casing 10 and used for input of signals to the module 32.

The cover member 31 is formed of an elastic material such as synthetic rubber. The cover member 31 forms the first side face 35, second side face 36, first bottom face 37, second bottom face 38 and top face 39 of the module unit 27.

Figure 8:
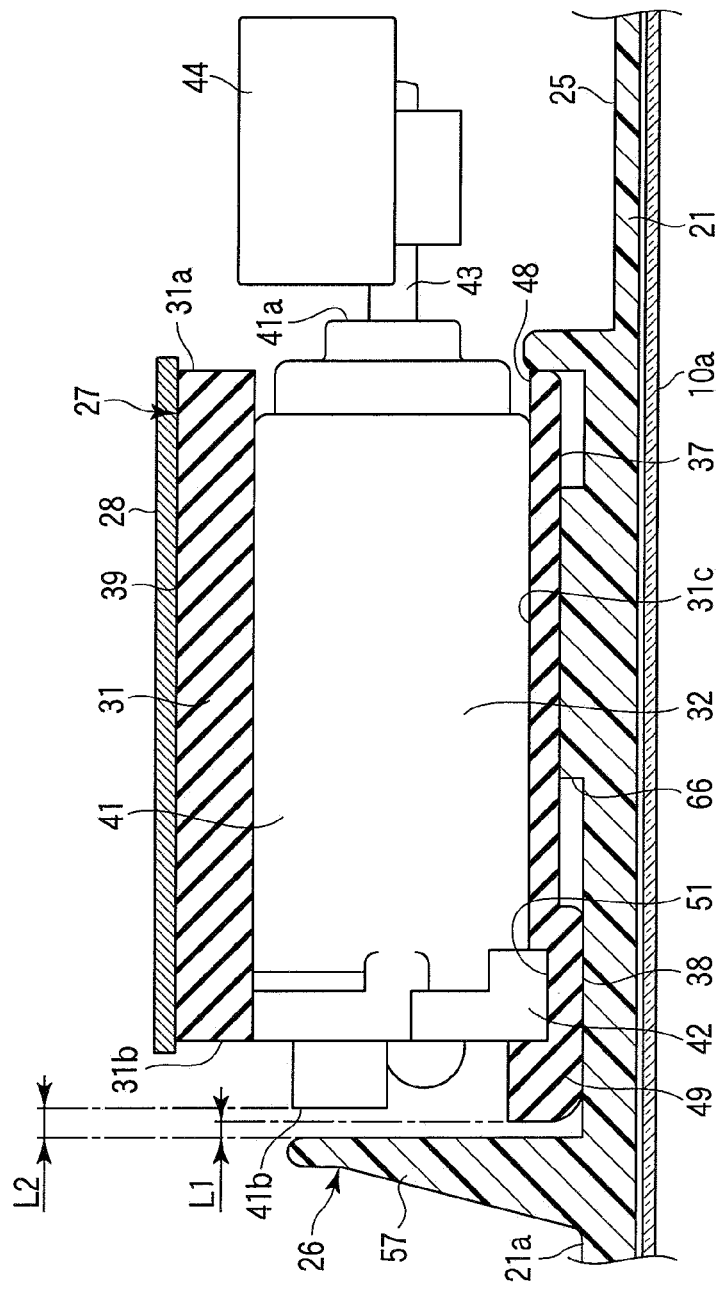
FIG. 8 is a sectional view taken along line F8-F8 in FIG. 4.

The cover member 31 is provided with a projection 47, a hole section 48, an extended portion 49, and an engagement portion 51 (shown in FIG. 8). The projection 47 is provided on the first side face 35. In other words, the projection 47 is provided on only one side face of the cover member 31.

The projection 47 is projected from the first side face 35 at a position close to the top face 39. As shown in FIG. 5, the projection 47 is substantially triangular and has its apex oriented toward the first bottom face 37 and second bottom face 38.

FIG. 7 is a sectional view taken along line F7-F7 in FIG. 4 and showing part of the mask member 21, module unit 27 and fixing member 28. As shown in FIG. 7, dimension W of the module unit 27 as measured between the first side face 35 and the second side face 36 is less than dimension H between the first bottom face 37 and top face 39. Likewise, dimension W between the first side face 35 and the second side face 36 is less than the dimension between the second bottom face 38 and the top face 39.

FIG. 8 is a sectional view taken along line F8-F8 in FIG. 4 and showing part of the mask member 21, module unit 27 and fixing member 28. As shown in FIG. 8, the hole section 48 extends from one end 31a of the cover member 31 to the other end 31b thereof.

The extended portion 49 is projected from the other end 31b of the cover member 31. The second bottom face 38 of the module unit 27 is continuous with the extended portion 49. The end of the extended portion 49 is located outward of the end of the module 32.

The engagement portion 51 is depressed from the inner circumferential surface 31c of the cover member 31 that defines the hole section 48. The engagement portion 51 is located adjacent to the extended portion 49. It should be noted that the engagement portion 51 may be provided at another position on the inner circumferential surface 31c of the cover member 31 or may be provided for the extended portion 49.

The trunk portion 41 of the module 32 is inserted into the hole section 48 from the other end 31b of the cover member 31. When the trunk portion 41 is inserted into the hole section 48, the overhang portion 42 comes into engagement with the engagement portion 51. Since the overhang portion 42 is engaged or latched by the engagement portion 51, the module 32 is prevented from slipping off the hole section 48.

Figure 9:
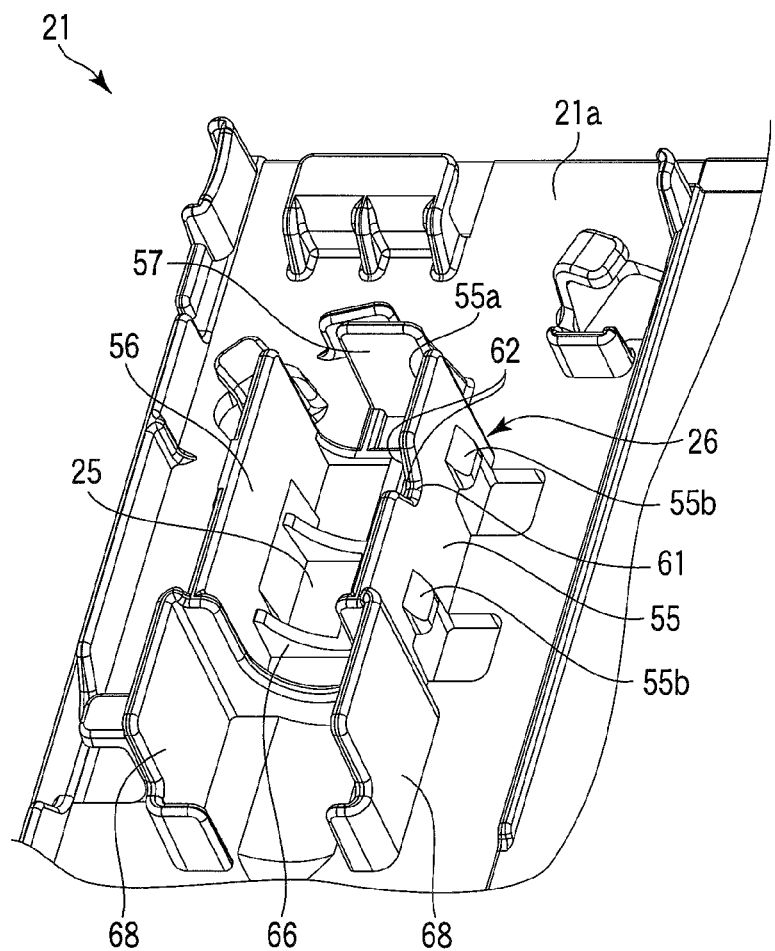
FIG. 9 is a perspective view showing the mask member of the embodiment in the state where the module unit and a fixing member are removed.

FIG. 9 is a perspective view showing the mask member 21 in the state where the module unit 27 and the fixing member fixing member 28 are removed. As shown in FIG. 9, the holding portion 26 protrudes from the installation portion 25. The holding portion 26 includes a first rib 55, a second rib 56 and a third rib 57. The second rib 56 is opposed to the first rib 55.

The first rib 55, second rib 56 and third rib 57 protrude from the installation portion 25. The first rib 55, second rib 56 and third rib 57 may be integral with one another. The first rib 55, second rib 56 and third rib 57 surround the module unit 27 mounted on the installation portion 25.

As shown in FIG. 7, the first rib 55 is in contact with the first side face 35 of the module unit 27. The second rib 56 is in contact with the second side face 36 of the module unit 27. The first rib 55 and second rib 56 secure and hold the module unit 27.

As shown in FIG. 8, the third rib 57 is opposed to the end of the extended portion 49. Distance L1 between the third rib 57 and the cover member 31 is shorter than distance L2 between the third rib 57 and the module 32. The extended portion 49 may be in contact with the third rib 57. The module 32 is separate from the third rib 57.

As shown in FIG. 9, the first rib 55 is provided with a fitting portion 61. The fitting portion 61 is a cutout section formed at the distal end 55a of the first rib 55. The fitting portion 61 is provided only for the first rib 55.

The distal end 55a of the first rib 55 is an example of a peripheral region of the holding portion. The fitting portion 61 is not limited to the distal end 55a but may be provided at another portion of the first rib 55. The first rib 55 has a pair of edge portions 62 that define the fitting portion 61.

The edge portions 62 are provided in such a manner that they are more away from each other at positions closer to the distal end 55a of the first rib 55. Because the edge portions 62 have such a structure, the fitting portion 61 forms a substantial triangle having its apex orientated toward the installation portion 25. The shape of the fitting portion 61 corresponds to that of the projection 47 of the cover member 31.

FIG. 10 is a perspective view showing a state where the fixing member 28 is separated from the mask member 21 and the module unit 27. As shown in FIG. 10, the projection 47 of the cover member 31 is fitted into the fitting portion 61.

Since the shape of the fitting portion 61 corresponds to that of the projection 47, the projection 47 comes into contact with the edge portions 62. It should be noted that the shape of the projection 47 may be different from that of the fitting portion 61. The projection 47 inside the fitting portion 61 is exposed to the outside of the holding portion 26.

As shown in FIG. 7, when the module unit 27 is mounted on the mask member 21 and held by the holding portion 26, the module unit 27 protrudes from the holding portion 26. In other words, the top face 39 of the module unit 27 is located more away from the installation portion 25 than is the distal end of the holding portion 26.

The first rib 55 includes a pair of first claws 55b. The first claws 55b protrude from the first rib 55 in a direction away from the module unit 27. The second rib 56 includes a second claw 56a. The second claw 56a protrudes from the second rib 56 in a direction away from the module unit 27.

The fixing member 28 is formed, for example, by bending a metallic plate. The fixing member 28 covers the top face 39 of the module unit 27 and is fixed to the holding portion 26. The fixing member 28 fixes the module unit 27 in such a manner that the module unit 27 is held by the holding portion 26.

The fixing member 28 is provided with a plurality of engagement holes 64. The engagement holes 64 are provided at positions corresponding to the claws 55b and second claw 56a. The first claws 55b and second claw 56a fit into the engagement holes 64.

The fixing member 28 is in contact with the top face 39 of the module unit 27 projected from the holding portion 26. The fixing member 28 presses the module unit 27 against the installation portion 25. Therefore, the fixing member 28 firmly fixes the module unit 27. When the module 32 is driven, this structure permits vibration to be reliably transmitted from the module 32 to the cover member 31.

As shown in FIG. 9, the installation portion 25 is provided with an auxiliary rib 66. The auxiliary rib 66 is integral with the first rib 55, second rib 56 and installation portion 25. As shown in FIG. 7, the auxiliary rib 66 supports the module unit 27.

As shown in FIG. 10, a pair of fourth ribs 68 protrude from the installation portion 25. The fourth ribs 68 surround the eccentric weight 44 of the module unit 27. The fourth ribs 68 are provided in such a manner that a certain gap is provided between the eccentric weight 44 and the fourth ribs 68 even when the eccentric weight 44 is rotated. The fourth ribs 68 may be integral with the first rib 55, second rib 56 and third rib 57.

In the personal computer 1 having the above-mentioned structure, the fitting portion 61 is provided for the holding portion 26, which surrounds and holds the module unit 27. When the module unit 27 is held by the holding portion 26, the projection 47 of the module unit 27 fits into the fitting portion 61. The projection 47 is exposed to the outside of the holding portion 26.

When the module unit 27 is mounted on the mask member 21, the module unit 27 is pushed into the region between the first rib 55 and second rib 56 of the holding portion 26 in such a manner that the projection 47 is fitted into the fitting portion 61.

When the module unit 27 is mounted on the mask member 21 accurately, the projection 47 fits into the fitting portion 61. Since the projection 47 is exposed, it is easy to confirm whether or not the module unit 27 is accurately mounted on the mask member 21. In this manner, the module 32 is easily mounted in a predetermined state.

If the module unit 27 is pushed toward the holding portion 26 in an unintended direction or at an unintended position, the projection 47 may come into contact with the holding portion 26, for example. Alternatively, the projection 47 may be positioned away from the fitting portion 61. In this manner, the module unit 27 is prevented from being mounted in an undesirable manner.

The edge portions 62 are provided in such a manner that they are more away from each other at positions closer to the distal end 55a of the first rib 55. Since this structure permits the fitting portion 61 to be a substantial triangle, the projection 47 can be formed with a large manufacturing tolerance. Even the projection 47 prepared under such a manufacturing condition is reliably fitted into the fitting portion 61. In addition, the direction in which the module unit 27 should be pushed into the holding portion 26 is readily understood.

The module is not limited to a vibrating motor wherein an eccentric weight is attached to a rotating shift; it may be a vibrating motor having a disc shape. In addition, the module is not limited to a motor but an actuator, a speaker, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a casing;
   an installation portion provided inside the casing;
   a holding portion projected from the installation portion; and
   a module unit contained inside the casing, on the installation portion and within the holding portion, the module unit comprising an elastic cover member comprising a projection; and a vibrating module fitted in the cover member;
   wherein the holding portion comprises: a fitting portion located at a peripheral region thereof and in which the projection is fitted, the fitting portion comprising a pair of edge portions, each of the pair of edge portions comprising an upper portion and a lower portion, wherein the pair of edge portions tapers towards each other from the upper edge portions to the lower edge portions; and
   the projection is in contact with the edge portions and is exposed in the fitting portion to an outside region of the holding portion.

2. The electronic apparatus of claim 1, wherein:
   the holding portion comprises a first rib comprising the fitting portion, and a second rib opposed to the first rib; and
   the module unit is located between the first rib and the second rib and comprises: a first side face on which the projection is provided and which is in contact with the first rib; and a second side face opposed to the first side face and being in contact with the second rib.

3. The electronic apparatus of claim 2, wherein:
the module unit comprises a bottom face opposed to the installation portion and a top face opposite the bottom face; and
a distance between the first side face and the second side face is shorter than a distance between the bottom face and the top face.

4. The electronic apparatus of claim 3 further comprising:
a fixing member covering the top face of the module unit and secured to the holding portion, wherein the module unit is held by the holding portion and the fixing member.

5. The electronic apparatus of claim 4, wherein the module unit is pushed by the fixing member against the installation portion.

6. The electronic apparatus of claim 5, wherein:
the vibrating module comprises an elongated trunk portion and an overhang portion provided on the trunk portion and projected from the trunk portion; and
the cover member comprises a hole section into which the trunk portion is inserted and an engagement portion which is engageable with the overhang portion.

7. The electronic apparatus of claim 6, wherein:
the holding portion comprises a third rib, the vibrating module unit is surrounded by the third rib in cooperation with the first rib and the second rib; and
a distance between the third rib and the cover member is shorter than a distance between the third rib and the vibrating module.

8. The electronic apparatus of claim 5, wherein the vibrating module is a motor.

9. An electronic apparatus comprising:
a casing;
an installation portion provided inside the casing;
a holding portion projected from the installation portion; and
a module unit contained inside the casing, on the installation portion and within the holding portion, the module unit comprising a vibrating motor and a cover member provided with a projection, at least a part of the vibrating motor is covered by the cover member;
wherein the holding portion is provided with a fitting portion in which the projection is fitted, the fitting portion comprising a pair of edge portions, each of the pair of edge portions comprising an upper portion and a lower portion, wherein the pair of edge portions tapers towards each other from the upper edge portions to the lower edge portions.

10. The electronic apparatus of claim 9, wherein:
the fitting portion is a cutout section provided in a peripheral region of the holding portion; and
the projection is in contact with each of the edge portions.

11. The electronic apparatus of claim 1, wherein the fitting portion forms a substantial triangle.

12. The electronic apparatus of claim 9, wherein the fitting portion forms a substantial triangle.

13. The electronic apparatus of claim 1, further comprising a fixing member secured to the holding portion, wherein a top face of the module unit is covered by the fixing member and pressed by the fixing member toward the installation portion.

14. The electronic apparatus of claim 13, wherein the top face of the module unit comprises the projection, and the projection of the module unit is pressed by the fixing member toward the installation portion.

15. The electronic apparatus of claim 9, further comprising a fixing member secured to the holding portion, wherein a top face of the module unit is covered by the fixing member and pressed by the fixing member toward the installation portion.

16. The electronic apparatus of claim 15, wherein the top face of the module unit comprises the projection, and the projection of the module unit is pressed by the fixing member toward the installation portion.

* * * * *